United States Patent
Guok et al.

(10) Patent No.: US 7,844,777 B2
(45) Date of Patent: Nov. 30, 2010

(54) CACHE FOR A HOST CONTROLLER TO STORE COMMAND HEADER INFORMATION

(75) Inventors: Ngek Leong Guok, Perak (MY); Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 11/821,865

(22) Filed: Jun. 26, 2007

(65) Prior Publication Data

US 2009/0006670 A1    Jan. 1, 2009

(51) Int. Cl.
   *G06F 12/00* (2006.01)
   *G06F 13/00* (2006.01)
   *G06F 3/00* (2006.01)
(52) U.S. Cl. ............... 711/118; 711/154; 711/E12.026; 710/36; 710/40
(58) Field of Classification Search .................. 711/154, 711/118, E12.026; 710/36, 40
See application file for complete search history.

(56) References Cited

U.S. PATENT DOCUMENTS

| | | | | |
|---|---|---|---|---|
| 5,987,595 | A * | 11/1999 | Yoaz et al. | 712/216 |
| 2005/0102555 | A1* | 5/2005 | Matsumoto et al. | 714/6 |
| 2007/0050538 | A1* | 3/2007 | Northcutt et al. | 711/112 |
| 2008/0183921 | A1* | 7/2008 | Chang et al. | 710/58 |

OTHER PUBLICATIONS

U.S. Appl. No. 11/479,413, Filed Jun. 30, 2006, entitled "Serial Advanced Technology Attachment Device Presence Detection And Hot-Plug In Low Power Mode," by Eng Hun Ooi, et al.

* cited by examiner

*Primary Examiner*—Mardochee Chery
(74) *Attorney, Agent, or Firm*—Trop, Pruner & Hu, P.C.

(57) ABSTRACT

In one embodiment, the present invention includes a host controller having a cache memory to store entries each including, at least, a command header (CH) portion having data associated with a command from the host controller to one of multiple devices coupled to a port multiplier, and a physical region descriptor (PRD) portion to store address information associated with a next address for data transfer with regard to the command. Other embodiments are described and claimed.

17 Claims, 3 Drawing Sheets

CACHE FOR A HOST CONTROLLER TO STORE COMMAND HEADER INFORMATION

BACKGROUND

Recently, a new switching mode has been provided for serial-advanced technology attachment (SATA) devices, referred to as frame information structure (FIS)—based switching (hereafter called "FBS"). FBS allows a host controller (Host) to have commands outstanding to multiple devices sitting behind a port multiplier (PM) at any point of time. When commands are outstanding to multiple devices, the PM may deliver FISs from any device with commands outstanding. In current systems, it is possible to have up to a maximum of 16 devices (inclusive of PM) attached to a SATA port of a host. However, there generally does not exist hardware support to enable switching on all devices at a single time.

DETAILED DESCRIPTION

In various embodiments, in order to reduce hardware support on FBS-enabled systems, a cache memory may be provided in a chipset component to enable efficient switching of all devices. In this way, die size reduction, as well as reduced latency or a need to fetch information from system memory can be realized.

Figure 1:
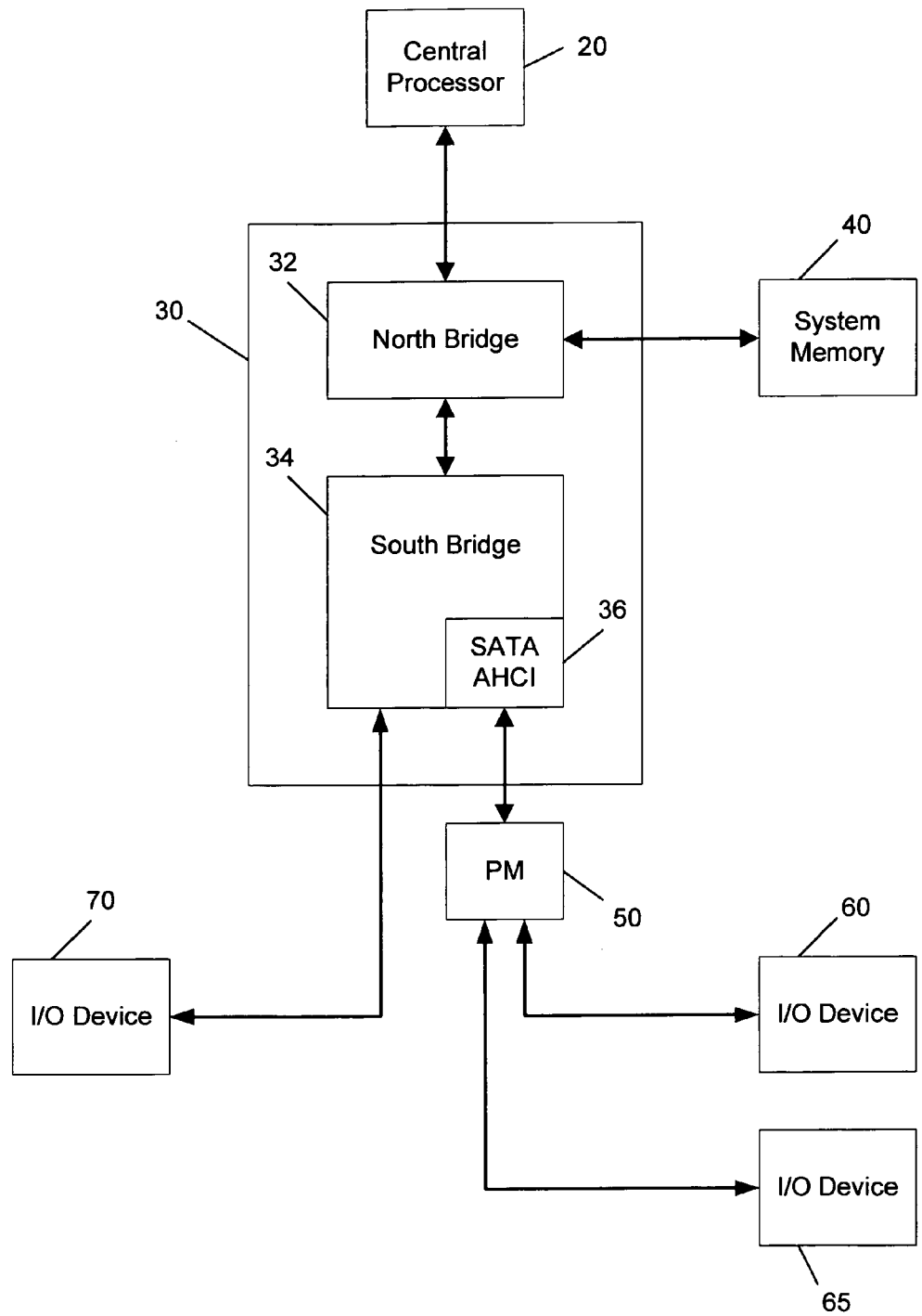
FIG. 1 is a block diagram of a system in accordance with one embodiment of the present invention.

FIG. 1 is a block diagram of a computer system which may be used with embodiments of the present invention. The computer system 10 includes a central processor 20 that is coupled to a chipset 30, which in turn is coupled to a system memory 40. In one embodiment, a system memory controller is located within a north bridge 32 of chipset 30. In another embodiment, a system memory controller is located on the same chip as central processor 20. Information, instructions, and other data may be stored in system memory 40 for use by central processor 20 as well as many other potential devices.

Input/output (I/O) devices, such as I/O devices 60, 65, and 70, are coupled to a south bridge 34 of chipset 30 through one or more I/O interconnects. In one embodiment, the interconnects may be Peripheral Component Interconnect (PCI) interconnects and I/O device 70 is a network interface card. In one embodiment, I/O devices 60 and 65 are SATA devices such as a hard disk, a compact disk (CD) drive, or a digital video disc (DVD) drive. In this embodiment, a SATA host controller 36, which may be in accordance with the SATA Advanced Host Controller Interface (AHCI) rev.1.1 (or another such specification), may be located within chipset 30 and is coupled to a port multiplier 50 behind which I/O devices 60 and 65 are coupled. In one embodiment, the SATA AHCI 36 is located within south bridge 34 of the chipset 30. Host controller 36 allows I/O devices 60 and 65 to communicate with the rest of the computer system.

Figure 2:
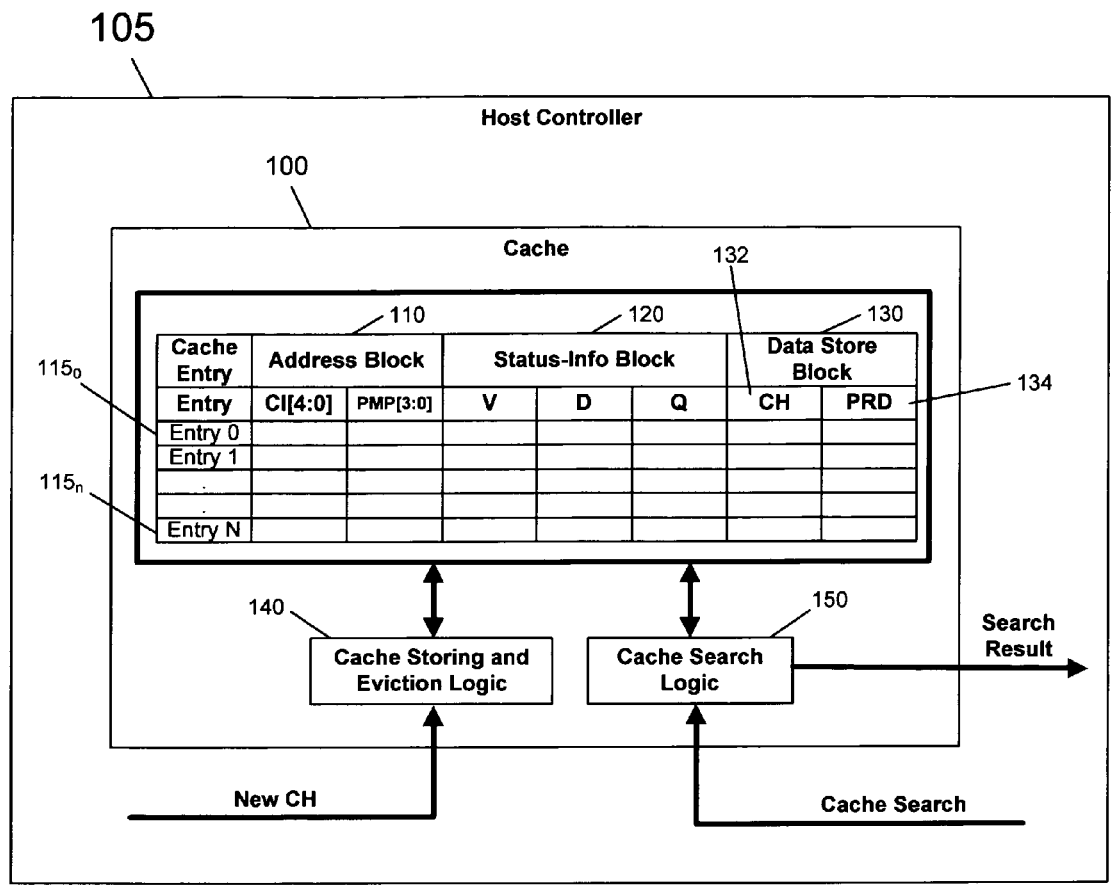
FIG. 2 is a block diagram of a cache memory in accordance with one embodiment of the present invention.

Referring now to FIG. 2, shown is a block diagram of a cache memory in accordance with one embodiment of the present invention. As shown in FIG. 2, cache 100 may be present in a host controller 105, and more particularly part of a SATA AHCI portion of the controller. Cache 100 can be separated into 3 blocks, namely an address block 110, a status block 120, and a data store block 130. As shown in FIG. 2, address block 110 may store a command issued (CI) tag and a port multiplier port (PMP) tag, where the CI tag is widely used to store to cache 100 and search to get information, while the PMP tag may be only used for single device error (SDE) cleanup.

As shown in FIG. 2, cache 100 may include a plurality of entries $115_0$-$115_n$ (generically entry 115). Each entry may include information in the three blocks, with address block 110 storing address or other tag information, status block 120 storing status information associated with the entry, and data store block 130 storing the actual data of the entry, including a command header (CH) field or portion 132 and a physical region descriptor (PRD) field or portion 134.

In addition to the address, tag, and status data, cache memory 100 may store pieces of information that are needed for switching. In one embodiment, command header (CH) field 132 may store 78 bits, although the scope of the present invention is not limited in this regard. Specifically, in one embodiment this portion may store the following: command table descriptor base address CTBA[63:7], write (W), port multiplier port (PMP) [3:0] and physical region descriptor table length (PRDTL) [15:0]. CTBA contains the physical address of the command table, W indicates the direction of the data transfer, PMP indicates the port behind a PM for which a command is targeted and PRDTL contains the length of scatter gather descriptor table in entries.

As further shown in FIG. 2, data in PRD portion 134, which may be dependent on data in CH portion 132, can be approximately 64 bits. In one embodiment this portion may store data base address DBA[63:1] and interrupt on completion (I). DBA contains the physical address of the data block and I indicates whether to generate an interrupt after the corresponding data block is transferred. In some embodiments, separate 'valid' bits may be present for PRD portion 134. CH portion 132 may be used to obtain a PRD base address for the corresponding entry in PRD portion 134. Data in PRD portion 134 may only be needed when data transfer begins, in one embodiment.

Status block 120 may be used to store information about a cache entry. In one embodiment, it may contain a "V" or "Valid" bit, which when set means all data in the corresponding cache entry is valid. The "D" Flag stands for "Data Phase," and is set when data transfer begins. The "Q" Flag stands for "Queue," which means presence of a native command queuing (NCQ) command, i.e., this bit is set if the corresponding CH portion of the entry is a NCQ command.

In the embodiment of FIG. 2, cache 100 has one store port, which has storing and eviction logic 140, and search logic 150 including two search ports using CI and one search port using PMP. The cache search ports may be used to retire and invalidate a command, store PRD data as well as to retrieve CH and PRD data whenever needed. Thus storing and eviction logic 140 may receive incoming CH information, including address tag information, namely CI and PMP fields for the associated CH, along with the CH contents. If an available entry 115 is present, logic 140 may store the data in the entry. Otherwise, logic 140 may select a given entry 115 for eviction and then store the CH information in the evicted entry 115. For searching cache 100, logic 150 may use either CI information or PMP information, or a combination thereof. Based on whether a hit occurs, logic 150 may provide search results, which may correspond to a hit or miss indicator, as well as data, namely CH and/or PRD data as an output, in cases of a hit.

In various embodiments, latency improvement and reduced dynamic random access memory (DRAM) accesses may be realized with a FBS cache. For example, in a cache hit scenario, the latency can be improved from 2 compulsory fetches to 0 fetches for data transfer to continue, i.e., data transfer can continue virtually immediately upon every switching scenario in FBS. Thus there is no need for a CH fetch and then based on the fetch request, performing a PRD fetch. In other words, rather than performing 2 fetches to memory to obtain CH information and then based on this information, obtain PRD data, instead if an entry is present that is associated with the device, data transfer can occur immediately.

In order for CH portion 132 to perform efficiently in FBS, certain policies may be adopted to intelligently reduce the need to fetch information from memory for devices that need the information the most. There may be four categories that make up a caching policy, in one embodiment. As to storage in the cache, the policy may be to always store when there is space in the cache. This will ensure that at any point of time when the number of commands outstanding is equal or less than total cache entries, all will have good switching performance.

There are certain commands which do not need to be cached regardless of the cache being full or not, since switching is either not needed or very minimal depending on switching implementation. Thus this requires additional storage policies to enhance cache performance especially when the number of devices attached to the PM is more than that of the total cache entries. Below are examples of commands that may not need to be cached:

a. Non-data commands (PRDTL equals zero), as such commands will not perform data transfer that requires aggressive switching.
  b. Commands with clear busy upon R_OK (C) bit in CH set, as such commands are sent to drive without expecting drive to respond.
  c. If CH fetch is for the case of direct memory access (DMA) Setup FIS with Auto Activate bit set for data transfer to the device with total data transfer less that what the host has been designed to send, as switching for data transfer purpose will only happen one time for that command.
  d. If CH is for the device with a single device error (SDE), as that CH if cached will be cleaned up in the near future anyway so it is unbeneficial to store it as it may evict another cache entry.

When the cache is full, eviction may occur according to CH priority. Table 1 below lists priority, with priority 1 being the highest.

TABLE 1

| No. | CH Attribute | Reason |
| --- | --- | --- |
| 1 | Data transfer has started | Device is ready to request or send data to Host and it will aggressively send FISs, which require aggressive switching. |
| 2 | Non-native command queuing (NCQ) command | One device in NCQ operation can have many commands outstanding. Only one command can have data transfer at a time. It is not deterministic to know which NCQ commands outstanding will begin data transfer, hence the possibility of having a cache hit is 1/N (assume there is 'N' number of commands outstanding) as opposed to non-NCQ commands which will have 100% cache hit. |
| 3 | First Come First Cache | CH that arrives at cache first would normally mean a command FIS would be dispatched to a device first, making it more possible for that device to begin data transfer as opposed to another CH to another device that arrives at cache at a later time. |

As the FBS cache includes at least a few entries, each cache entry may have different attributes of the CH information stored therein. The replacement algorithm may determine which cache entry to evict out of multiple entries to evict based on the general eviction policies above. To do so, for every CH already present in a cache entry (hereafter called CH_old), its CH attribute will be compared with the attribute of the CH which has just arrived at cache input (hereafter called CH_new).

The comparison may be done based on Table 1 above and the eviction decision can further be based on additional criteria, in one embodiment. A cache entry may be selected for certain eviction (a "Certain" eviction) where this cache entry has been identified as an eviction candidate and: CH_new is having data transfer (be it a NCQ or non-NCQ command) and CH_old is a NCQ command not having data transfer; or CH_new is a non-NCQ command not having data transfer and CH_old is a NCQ command not having data transfer. Another certain eviction candidate may be an entry associated with a device having a SDE.

A conditional eviction (a "Conditional eviction") may occur when a cache entry has been identified as an eviction candidate and the following scenarios exist. This cache entry can be evicted if and only if there is no candidate falling under the Certain category. Falling under this category are situations where: CH_new is having data transfer (be it a NCQ or non-NCQ command) and CH_old is a non-NCQ command not having data transfer.

In contrast, a cache line will not be evicted if a comparison result does not match the 'Certain' or 'Conditional' category above, i.e., the stored entry has a higher priority than the incoming entry.

Once a command is done with data transfer, the corresponding cache entry needs to be retired. Retiring may be done upon the last piece of data received or sent successfully, rather than waiting for a command closing FIS from a device (like Register—Device to Host (RD2H FIS) for non-NCQ or Set Device Bits (SDB) FIS for NCQ because for NCQ, a device is allowed to accumulate the closing of data transfer of a few commands in a single SDB). Not relying on SDB arrival to retire a cache entry is a clear advantage during NCQ operation because no cache entry will be wasted in the event of SDB FIS accumulations by the device.

Special invalidations may occur to invalidate one or more cache entries under certain special circumstances to make way for other CH's, especially in error conditions. For example, when a SDE occurs, such as when a device has an error, all commands associated with that device (NCQ case) still cached may be invalidated. For a non-SDE the whole SATA port is typically reset, and thus the cache may invalidate all cache entries. For situations where there is underflow of data, the command having the underflow issue can be invalidated. There could be scenarios where a command is not executed prior to the sending of the register—host to device (RH2D) FIS, hence invalidation of that command in the cache may be performed.

PRD portion 134 may be used to keep the information of the next address for data transfer to continue. The policy that this cache portion takes may be as follows: if the command is found in CH portion 132, then the information may be stored into the corresponding entry as CH portion 132, giving the highest priority to commands in data transfer to ensure that PRD portion 134 will not be overwritten. Thus PRD portion 134 is an extension of CH portion 132 to include PRD information in data store block 130.

Figure 3:
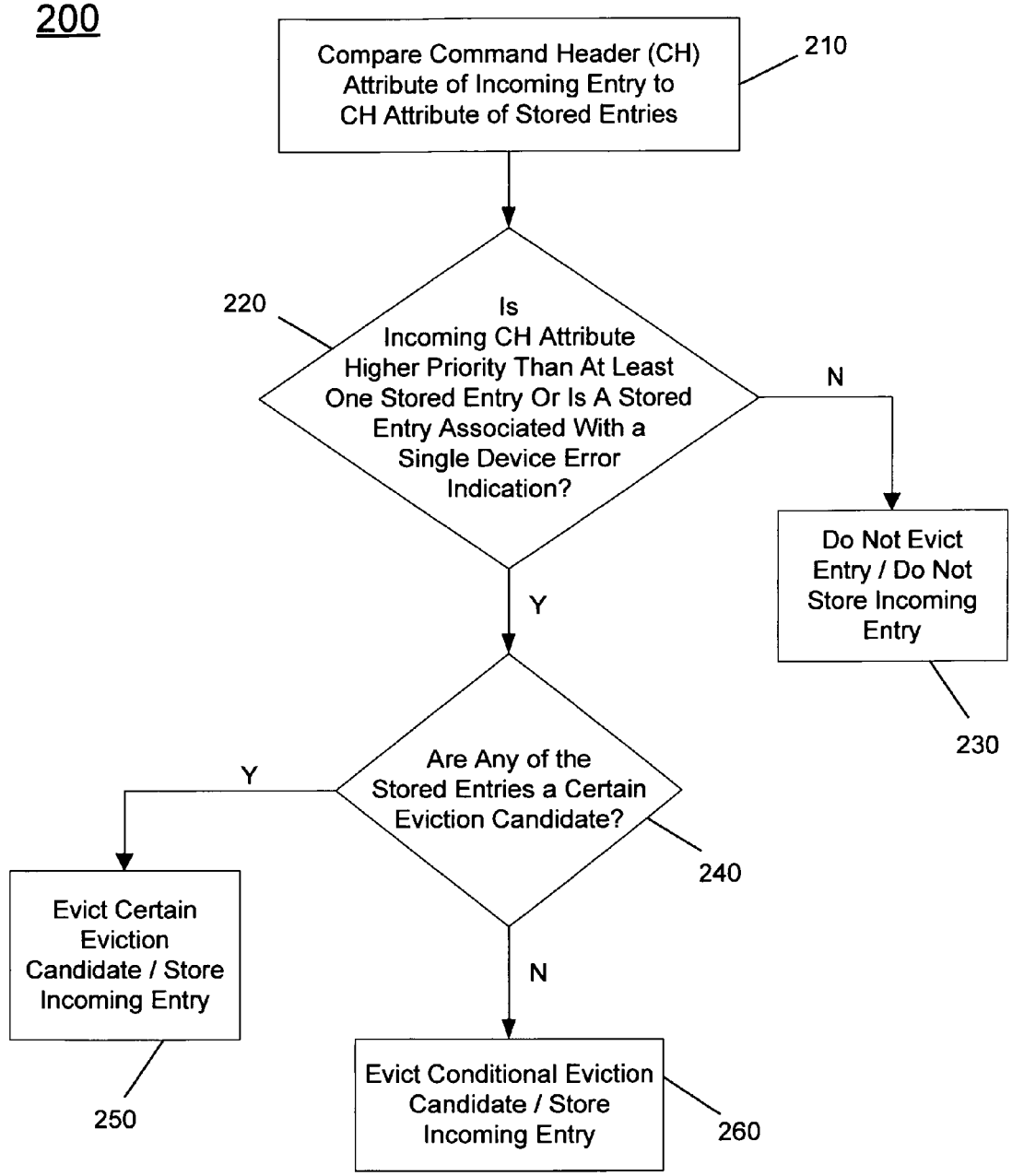
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be used to perform evictions as described above. In the embodiment of FIG. 3, method 200 may begin by comparing a CH attribute of an incoming entry to the CH attribute of stored entries in the cache memory (block 210). For example, in one embodiment the attribute scheme set forth in Table 1 may be used. Based on this comparison, it may be determined whether the incoming CH attribute is a higher priority than at least one stored entry or if a stored entry is associated with a SDE indication (diamond 220). If not, the incoming entry may not be stored and no stored entry is evicted (block 230).

Referring still to FIG. 3, if instead at diamond 220 it is determined that the CH attribute is higher than at least one stored entry or a SDE indication is present, control passes to diamond 240. At diamond 240 it may be determined whether any of the stored entries are a certain eviction candidate. As described above, based on certain criteria an entry may be determined to be a certain eviction candidate. If so, control passes to block 250 where the certain eviction candidate may be evicted and the incoming entry stored in place of the evicted entry. If instead it is determined that there are no certain eviction candidates, then control passes to block 260, as instead there is a conditional eviction candidate. Accordingly, the conditional eviction candidate may be evicted and the incoming entry stored in place of the evicted entry (block 260). While shown with this particular embodiment in the example of FIG. 3, understand that different eviction policies may be realized in other embodiments.

Thus using various embodiments, FBS performance may be enhanced without much die size area. Embodiments may be optimally utilized when the number of outstanding commands is equal or less than the supported number of cache entries (due to its policy to cache everything when it has available space). When the cache is full, it will intelligently decide whether to cache a new command so that FBS performance is improved and selection of which of the commands stored in the cache to evict improves cache hit rate. Furthermore, retiring of commands at the last chunk of data transfer increases cache usage by other commands outstanding. Still further, embodiments can handle error conditions with the ability to address using CI for any command specific error and PMP for any device specific error.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a host controller to be coupled to a port multiplier, wherein the port multiplier is to have a plurality of devices coupled thereto, the host controller including:
a cache memory storing a plurality of entries, each entry including an address field configured to store a command issued (CI) identifier and a port multiplier port (PMP) identifier, and a data field configured to store a command header (CH) portion having data associated with a command from the host controller to one of the plurality of devices and a physical region descriptor (PRD) portion configured to store address information associated with a next address for data transfer with regard to the command, wherein the cache memory includes logic configured to determine if the CH portion of an incoming entry is of a higher priority than at least one of the stored entries or if one of the stored entries is to be selected for certain eviction, based on a single device error (SDE) indication, and if so, evict the at least one of the stored entries and store the incoming entry.

2. The apparatus of claim 1, wherein the data of the CH portion is to include a command portion, a PMP portion and a PRD portion, and the address of the PRD portion is dependent upon the PRD portion of the CH portion.

3. The apparatus of claim 1, wherein each entry in the cache memory is to be associated with one of the plurality of devices coupled to the port multiplier.

4. The apparatus of claim 3, wherein the host controller is to transmit a command to a first one of the plurality of devices based on information in a first entry of the cache memory and to transmit a command to a second one of the plurality of devices based on information in a second entry of the cache memory without a fetch operation to a system memory coupled to the host controller.

5. The apparatus of claim 1, wherein each entry of the cache memory includes a status field to store a first flag to indicate beginning of a data transfer for an associated entry and a second flag to indicate whether the associated entry includes a native command queuing (NCQ) command.

6. The apparatus of claim 1, further comprising a first logic to evict a first entry of the cache memory if the first entry includes data for a native command queuing (NCQ) command that has not started a data transfer phase and an incoming entry includes data for a pending data transfer.

7. A method comprising:
comparing a command header (CH) attribute of an incoming entry to a cache memory of a host controller coupled to a port multiplier (PM) having a plurality of devices coupled thereto, to a CH attribute of stored entries in the cache memory;
determining if the CH attribute of the incoming entry is of a higher priority than at least one of the stored entries or if one of the stored entries is to be selected for certain eviction, based on a single device error (SDE) indication, wherein the one of the stored entries corresponds to a stored entry of the stored entries in the cache memory that is associated with the SDE indication and the incoming entry is not associated with a SDE indication;

preventing eviction of any of the stored entries if the CH attribute of the incoming entry is not higher, in priority, than the CH attribute of at least one of the stored entries or no stored entry is associated with the SDE indication, otherwise determining a candidate entry of the stored entries for eviction; and evicting the candidate entry and storing the incoming entry in place of the evicted entry.

8. The method of claim 7, further comprising determining if one of the stored entries is to be selected for certain eviction, based on the CH attribute of the one of the stored entries and the CH attribute of the incoming entry, wherein the one of the stored entries corresponds to a stored entry of the stored entries in the cache memory that is associated with a native command queuing (NCQ) command not having a data transfer and the incoming entry is associated with a non-NCQ command having a data transfer.

9. The method of claim 7, further comprising determining if one of the stored entries is to be selected for certain eviction, based on the CH attribute of the one of the stored entries and the CH attribute of the incoming entry, wherein the one of the stored entries corresponds to a stored entry of the stored entries in the cache memory that is associated with a native command queuing (NCQ) command not having a data transfer and the incoming entry is associated with a non-NCQ command not having a data transfer.

10. The method of claim 7, further comprising determining if one of stored entries is to be selected for conditional eviction, based on the CH attribute of the stored entry and the CH attribute of the incoming entry, wherein the one of the stored entries corresponds to a stored entry of the stored entries in the cache memory that is associated with a non-native command queuing (NCQ) command not having a data transfer and the incoming entry is associated with a command having a data transfer.

11. The method of claim 7, further comprising searching for a stored entry in the cache memory based on a port multiplier port (PMP) identifier, if the stored entry corresponds to a location for continued data transfer, and searching for the stored entry based on a command issued (CI) identifier if the stored entry does not correspond to a data transfer.

12. The method of claim 7, further comprising retiring a stored entry when a last piece of data associated with a command portion of the stored entry is sent or received successfully.

13. The method of claim 7, further comprising invalidating any stored entries associated with a first one of the plurality of devices if a single device error (SDE) occurs with respect to the first device.

14. A system comprising:
a processor;
a chipset coupled to the processor via a first interconnect, the chipset including a host controller configured to interface with a port multiplier, the host controller including:
  a cache memory storing a plurality of entries, each entry including an address field configured to store a command issued (CI) identifier and a port multiplier port (PMP) identifier, and a data field configured to store a command header (CH) portion having data associated with a command from the host controller to one of the plurality of devices and a physical region descriptor (PRD) portion configured to store address information associated with a next address for data transfer with regard to the command;
  a first logic configured to evict a first entry of the cache memory if the first entry includes data for a native command queuing (NCQ) command that has not started a data transfer phase and an incoming entry includes data for a pending data transfer, wherein the first logic is configured to further determine if one of the plurality of entries is to be selected for certain eviction, based on a single device error (SDE) indication, wherein the one of the plurality of entries is associated with the SDE indication and the incoming entry is not associated with a SDE indication; and
  a second logic configured to perform a cache search of the plurality of entries responsive to a cache search request based on at least one of a CI identifier and a PMP identifier of the cache search request.

15. The system of claim 14, wherein the first logic is to further determine if one of the stored entries is to be selected for certain eviction, based on the CH portion of the one of the stored entries and the CH portion of the incoming entry, wherein the one of the stored entries corresponds to a stored entry of the stored entries in the cache memory that is associated with a NCQ command not having a data transfer and the incoming entry is associated with a non-NCQ command having a data transfer.

16. The system of claim 14, wherein the first logic is to further determine if one of the stored entries is to be selected for certain eviction, based on the CH portion of the one of the stored entries and the CH portion of the incoming entry, wherein the one of the stored entries corresponds to a stored entry of the stored entries in the cache memory that is associated with a NCQ command not having a data transfer and the incoming entry is associated with a non-NCQ command not having a data transfer.

17. The system of claim 14, wherein the first logic is to further determine if one of stored entries is to be selected for conditional eviction, based on the CH portion of the stored entry and the CH portion of the incoming entry, wherein the one of the stored entries corresponds to a stored entry of the stored entries in the cache memory that is associated with a NCQ command not having a data transfer and the incoming entry is associated with a command having a data transfer.

* * * * *